Sept. 29, 1953 T. H. CLARK 2,654,049

ELECTRON SWITCH CONTROL SYSTEM

Filed April 30, 1947 2 Sheets-Sheet 1

INVENTOR.
TREVOR HAZARD CLARK
BY
Robert Harding Jr.
ATTORNEY.

Sept. 29, 1953 T. H. CLARK 2,654,049

ELECTRON SWITCH CONTROL SYSTEM

Filed April 30, 1947 2 Sheets-Sheet 2

INVENTOR.
TREVOR HAZARD CLARK
BY
Robert Harding Jr.
ATTORNEY.

Patented Sept. 29, 1953

2,654,049

UNITED STATES PATENT OFFICE 2,654,049

ELECTRON SWITCH CONTROL SYSTEM

Trevor H. Clark, Boonton, N. J., assignor to International Standard Electric Corporation, New York, N. Y., a corporation of Delaware Application April 30, 1947, Serial No. 745,013
In France April 7, 1939

Section 1, Public Law 690, August 8, 1946
Patent expires April 7, 1959

9 Claims. (Cl. 315—21)

The present invention relates to control systems actuated by electrical impulses and particularly to control circuits which follow the impulses received and do not operate when no impulse is received.

The invention more particularly relates to control systems of this type adapted to control cathode ray switches in electrical transmission systems such as automatic telephone systems.

It is an object of this invention to provide circuits for the control by impulses of electronic switches which actuate said switches so as to displace an electron beam thereof from one position to another, corresponding to different numbers of incoming impulses.

Another object of this invention is to provide circuits which control an electronic switch by impulses by transforming groups of incoming impulses into pairs of direct potentials for the deflection or deviation of the electron beam of the switch so that each pair of potentials has a combination of values corresponding to the number of impulses in the incoming group.

In accordance with one of the characteristics of the invention the control circuit, for deviation in one direction of the beam of an electronic switch under the action of incoming impulses, contains, in shunt across the terminals of a condenser, a gas discharge device (having either a hot or a cold cathode) in series with the magnet of a relay, the said device by its ionization, due to an accumulated charge in the condenser under the action of a predetermined number of received impulses, acting to discharge the condenser and to actuate said relay in order to control deviations of the beam in a second direction.

A control circuit of an electronic switch according to the invention may comprise a first control circuit provided with a capacity in shunt with a gas discharge device in series with a relay, this capacity accumulates a charge according to the number of incoming impulses by partially discharging for each impulse another capacity, normally in closed circuit on a source of direct potential, i. e., in closed circuit thereon between impulses, which, on each impulse, gives up charge to the first capacity and to a first deflector unit of said electronic switch. When a predetermined number of impulses has been received, the potential on the terminals of the first condenser reaches such a value that it involves the discharge of said discharge device and consequently the momentary energization of the relay in series therewith. This relay actuates a second control circuit of the electronic switch which circuit, by a similar arrangement of capacities and a fixed source of potential, applies, every time a predetermined number of impulses has been received, an incremental charge on a second deflector unit of said electronic switch, the second deflector unit acting to produce beam deviations in a different direction than that of the deflections caused by the first one.

In another embodiment of this invention a relay which couples the two control circuits comprises a first winding which, in a series circuit with the discharge device, is in shunt across the terminals of the storing condenser, and a second winding passing through an armature and a contact also in shunt across this condenser.

In still another embodiment the said coupling relay is provided, in addition to its set of contacts, which actuate the second control circuit, with a set of contacts for energizing another relay which closes an auxiliary discharge circuit of the condenser through a resistor in response to each energization of the coupling relay and thus accelerates the completion of the discharge of the condenser.

The invention will be described in particular with respect to an impulse transmitting system comprising a telephone dial which controls the position of the electron beam of a cathode ray marker switch. However, it is clear that the invention can equally well be applied to a similar control function in other systems such as metering systems of any kind, devices for counting objects, for counting revolutions, etc., in which the speed of metering is only limited by the speed of operation of relays employed in the control circuits and/or the period of discharge of any gas discharge device therein.

In the embodiment to be described the electronic switch has its beam deflected in two directions at right angles to each other. However, it is obvious that the invention may be adapted to an electronic switch with other and/or more complex beam-position patterns. Successively actuated control circuits are employed each of which, with the exception of the last one, comprise in addition to a stepping condenser a gas discharge device in series with a relay winding both on the terminals thereof—the relay serving to couple any of the control circuits to the next one.

In particular the invention will be described in detail in connection with the attached drawings in which.

Figures 1, 4:
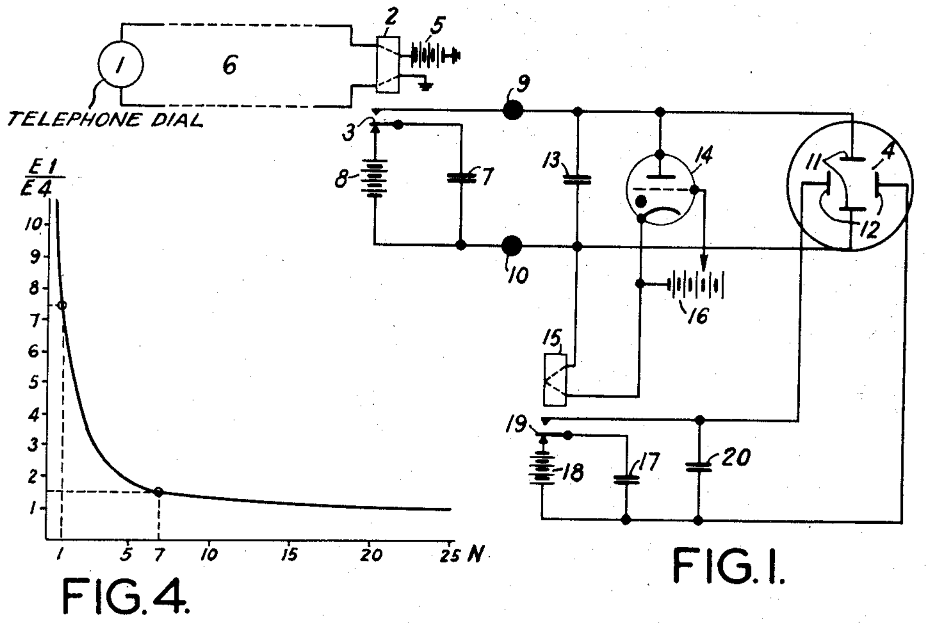
Fig. 1 represents one embodiment of the invention.
Figs. 3 and 4 show curves used hereinafter to assist in the description.

In Fig. 1 when impulses emitted from an ordinary telephone dial 1, are received by a relay 2, its armature 3 follows the impulses transmitted and actuates a control circuit for a cathode ray switch 4. The circuit of relay 2 passes from a grounded battery 5 through a winding of the relay, through one wire of line circuit 6 through contacts (not shown) of dial 1, through the other line wire, and through a second winding of relay 2 to ground.

Figure 2:
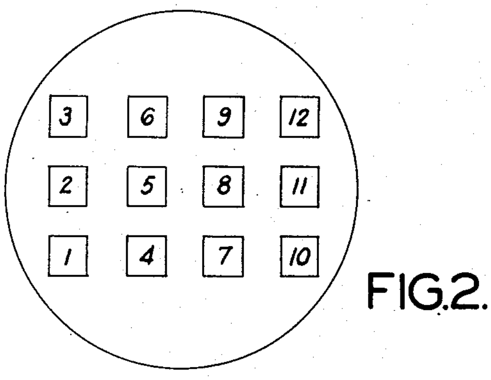
Fig. 2 shows one type of position pattern in which collecting electrodes (terminals) of the cathode ray switch may be arranged.

Armature 3 of this line relay 2, normally (when it is not receiving an impulse) rests on its back contact, thus closing a circuit for charging a condenser 7 from a battery 8 or some other source of direct potential. The front contact of armature 3 is connected to a terminal 9 of the first control circuit of electronic switch 4. A point of fixed connection between condenser 7 and battery 8 is connected to the other terminal 10 of the control circuit. Electronic switch 4 is represented for the sake of simplicity by two pairs of deflection plates, 11 and 12. However, it is obvious that in other embodiments of this invention other deflecting means such as magnets may be employed. Likewise while this device may be an ordinary cathode ray tube with its fluorescent screen replaced by a set of conductive terminals or contact studs (such as indicated in Fig. 2) it may likewise be a cathode ray switch of any suitable form, such as one of the devices described in the French Patent #857,575 published September 19, 1940.

The positioning control circuit of electronic switch 4 comprises a first control circuit formed by a condenser 13 in shunt between terminals 9 and 10 and a series circuit including a gas discharge device 14 and the winding of a relay 15 connected across the terminals of said condenser 13. This first control circuit is connected to a pair of deflection plates 11 of switch 4. Bias source 16, shown in Fig. 1 as a battery, is connected between the control grid and the cathode of discharge device 14 in order to determine its firing potential. Device 14 does not necessarily have to consist of a gas triode tube. It may consist of any device which breaks down to have very low internal resistance under a predetermined electrical tension but has very high resistance when the value of the potential across its terminals is too low either to sustain a breakdown which has been established or to establish a breakdown. The deionization time of device 14 should be low with respect to the period between two successive impulses sent from dial 1.

Relay 15 serves as a coupling between the first control circuit and a second control circuit which comprises a condenser 17 normally in closed circuit with a battery 18 through an armature 19 (and its back contact) of a relay 15. A stepping condenser 20, whose function is similar to that of condenser 13 of the first control circuit, is connected between the front contact of armature 19 and a fixed connection between battery 18 and condenser 17. Condenser 20 is permanently connected across the second pair of connecting plates 12 of cathode ray switch 4.

The operation of a circuit of this kind is as follows:

When dial 1 is operated to send impulses over line 6, relay 2 follows these impulses as its energizing circuit is intermittenly closed by the contacts (not shown) of dial 1.

As mentioned above, when the dial contacts are open and relay 2 is inoperative, armature 3 rests on its back contact. Under these conditions condenser 7 is in a closed circuit with battery 8 and quickly charges to the potential thereof since the effective resistance of the charging circuit is very low. Each time the dial contacts are closed relay 2 is actuated and armature 3 swings to its front contact disconnecting condenser 7 from battery 8 and completing its connection across condenser 13—more specifically with respect to Fig. 1—it completes the connection of condenser 7 across terminals 9 and 10.

The potential on the terminals of condenser 7 is thus applied to the terminals of condenser 13 as well as to the main gap of gas discharge device 14 through the magnet of relay 15. The potential on the terminals of condenser 7 is also applied to the part of deflecting plates 11 of switch 4. The electron beam of switch 4 will be deflected and when current has ceased to flow from condenser 7 into condenser 13 the beam will have moved from its rest position (if the received impuse is the first one), or from a position in one of the horizontal rows shown in Fig. 2, to a new horizontal level, i. e., a position in the first or next higher horizontal row. For example, assuming that the impulse received is the first one of a group (or that the group consists of only one impulse, i. e., the digit transmitted is 1) the beam will move from some suitable rest position in or opposite to an end of the left vertical column of positions shown in Fig. 2, from some rest position, which perhaps is entirely off the screen, up to the level of the bottom horizontal row. Thus it will move from a non-working position to the first position representing a digit. On account of the choice of relative values of capacitance of condensers 7 and 13 and of the bias of the discharge device, the potential across condenser 13 acquired by a single charge being received in condenser 7 will not be of sufficient magnitude to cause the ionization of device 14 and the consequent operation of relay 15. Since the resistance of the discharge device therefore remains very high, condenser 13 cannot discharge but, instead, will store the first charge.

At the end of the first impulse relay 2 will be deenergized and armature 3 will return to its rest contact, thus again closing the charging circuit of condenser 7 from battery 8. Condenser 7 will be recharged practically instantaneously to the full potential of battery 8 for reasons already stated. However, for the time being, the electronic beam of switch 4 will remain on position 1 since the potential which maintains it there will continue to be applied only by condenser 13.

When a second impulse is thereafter transmitted from dial 1 relay 2 will again be actuated. Armature 3 will again swing from its rest contact to its front contact opening the circuit of battery 8 with condenser 7 and connecting together condensers 7 and 13. Condenser 13 will receive an additional charge and its new potential will be substantially equal to twice that produced by the first charge. The electron beam will be deflected vertically to position 2 under the action of this increased potential. However, the bias applied to device 14 is so chosen that even after condenser 13 has received this second charge the device will not be ionized. Therefore the second charge will also be stored.

At the end of the second impulse relay 2 will again be deenergized and in the manner described above condenser 7 will be recharged substantially instantaneously. The electron beam will remain on position 2.

Upon the reception of the third impulse the operation of the first control circuit will be similar to that already described with respect to the first two impulses and the beam will reach top position 3 of the left vertical column of Fig. 2. At the end of this impulse condenser 7 will again quickly be recharged.

The description thus far has concerned only the first control circuit, i. e., that which applies vertical deflection potentials to elements 11 of switch 4. According to the embodiment of switch 4 shown in Fig. 2 the next position which the beam is to take will be that numbered 4, i. e., the lowest position of the second vertical column. Therefore it is necessary to provide on the fourth impulse an actuation of the second control circuit, i. e., the application of a horizontal deflecting potential to elements 12 of switch 4 and at the same time an actuation of the first control circuit to cause it to restore the beam to the low level of the first horizontal row. For this purpose the bias on discharge device 14 is adjusted so that it will be ionized (and rendered conductive) by the potential attained across condenser 13 on its receiving a fourth charge in response to the fourth impulse. Accordingly, when the fourth impulse is received and relay 2 operates in the manner already described, the total charge accumulated in condenser 13 will be large enough so that he resulting potential across its terminals will ionize the discharge device, breaking it down and reducing its internal impedance. Condenser 13 will discharge through this low impedance and the winding or relay 15 and the potential across its terminals will drop down near to the extinction potential of the gas discharge device. Two substantially simultaneous effects on switch 4 will result therefrom.

The first effect will be the cancellation of most of the deflection potential applied between elements 11 of the switch. This will result in bringing the beam down to the level of the bottom row of numbered positions. At the same time a potential will be applied through the second control circuit to deflection plates 12. This potential will have such a value as to laterally displace the electron beam from the first column of the numbered positions to the second one, Therefore, the electron beam will come to rest on the position marked 4 in Fig. 2.

It is obvious that after a complete cycle of operation of a system including switch 4 (for example, in a telecommunication system employing the present invention, after a call has been put through and has ended) associated switching means (not shown) will be needed to restore the control circuits to normal by fully discharging condensers 13 and 20 to permit the electron beam under the control of static positioning potentials, to swing back to a non-working rest position, for example a position which is opposite the bottom end of the left vertical column, and below the level of the bottom horizontal, perhaps completely off screen.

However, it is also obvious that in other embodiments of this invention static positioning potentials may so be applied to elements 11 and 12 and so adjusted that the rest position of the beam will be in the left vertical column and the bottom horizontal row, i. e., the area now designated as 1 in Fig. 2, when condensers 13 and 20 are both fully discharged. In such embodiments a gas discharge device, having a very low extinction potential, may be employed. Such a device, when it fires, will completely discharge condenser 13 and the beam will fall back substantially to the level of the bottom horizontal row of numbered positions. Of course, in such an arrangement the position now shown as 1 in Fig. 2 would be an idle position, i. e., it would either entirely lack a conductive terminal or its terminal would be unused. In such an embodiment the first useful position, that corresponding to a first received impulse, would be at the position now designated as 2 on Fig. 2.

The second control circuit operates to displace the electron beam laterally from one vertical column of positions to the next as follows: when discharge device 14 becomes conductive, condenser 13 is discharged through it and the magnet of relay 15. Relay 15 therefore is energized for a short time (the discharge time). It will function with respect to the second control circuit in a manner which corresponds to the function of relay 2 with respect to the first control circuit. Relay 2 repeats each received impulse, relay 15 repeats only predetermined ones of the received impulses. In some embodiments these may be every third, or fourth, or "*n*th" received impulse. Armature 19 of relay 15 swings from its back contact to its front contact opening the circuit for charging condenser 17 from battery 18 and connecting condenser 17 in parallel with stepping condenser 20. The charge received on the stepping condenser is applied across another pair of deflecting plates of switch 4 which cause lateral deflection of the beam. In order that the deflection for one charge (one step) will be the distance between two vertical columns of positions shown in Fig. 2, the values of condensers 17 and 20 as well as that of battery 18 must be properly selected.

Condenser 20 of the second control circuit will store its first charge until the next operation of relay 15, that is until the seventh impulse is received from dial 1. At this seventh impulse relay 15 will again operate in the manner already explained and condenser 20 will receive an additional charge from condenser 17 whereby the beam will be deflected to the third column. In the same way on the tenth impulse relay 15 will again operate and the beam will be further deflected to the fourth column.

Obviously, after this apparatus has translated the transmission of a group of impulses from dial 1 into a positional representation of the number of impulses in the group, and after it has stored the representation until full use has been made of it, means will be required to restore the apparatus to its ready condition for its next useful cycle of operation.

An auxiliary circuit will be required. A telecommunication system, for example which would include subscriber's stations, exchanges, etc. and which would include also apparatus according to this invention, could be arranged in accordance with well known automatic telephone art so that the system would comprise means for releasing switch 4 and restoring it to a ready condition after each occasion where use has been made of information stored in it, i. e. after each complete cycle of its operation.

Such an auxiliary circuit may comprise metallic short circuits, such as could be provided via relay armatures to be placed in shunt across stepping condensers 13 and 20 after switch 4 has completed one operating cycle. This would cause the beam to swing to its rest position from its last used operating position. That is to say relay means could be employed to discharge condensers 13 and 20, in order to permit the electron beam to swing back both laterally and vertically to a rest position opposite the lower end of the first vertical column and either at or below the level of the bottom horizontal row (depending upon embodiment, i. e., where the first used position is located).

It might be desired to embody the invention in apparatus for counting long trains of pulses by translating the number thereof into a multi-digit representation in which each of a plurality of cathode ray switches is assigned to represent a different digit for example, the thousands digit, or the hundreds digit, or the tens digit or units. In such an embodiment the number of positions on each switch would be selected in accordance with the numerical system used. Ten position switches would be best for a decimal system. In such a device upon the receipt of impulse number 11 the beam of the tube adapted to represent unit digits should be made to swing to its rest or "0," position and that of the tens digits tube should be made to swing to its position number 1. In such a device the second control circuit could be made to include a discharge device such as device 14 shown for the first control circuit and in such an arrangement both discharge devices would operate on the 10th impulse. A suitable position-pattern on the target area would be one containing 9 positions in three rows and three columns.

The individual and relative values of the condensers 7 and 13 and 17 and 20 as well as of other circuit elements can be suitably chosen in accordance with design practices well known in the art. In deciding on the proper values the following factors may be taken into consideration.

1. The magnitude of current which may pass through the contacts of relays 2 and 15, respectively without damaging them.

2. The speed of discharging (or charging) of condenser 13 by deflection plates 11 or of condenser 20 by deflection plates 12.

3. The values of the direct potentials supplied by sources 8 and 18.

4. The deflection potentials required by the cathode ray switch.

5. The characteristics of the gas discharge device.

6. The desired amount of deflection, i. e., the spacings of the numbered positions or terminals.

Figure 3:
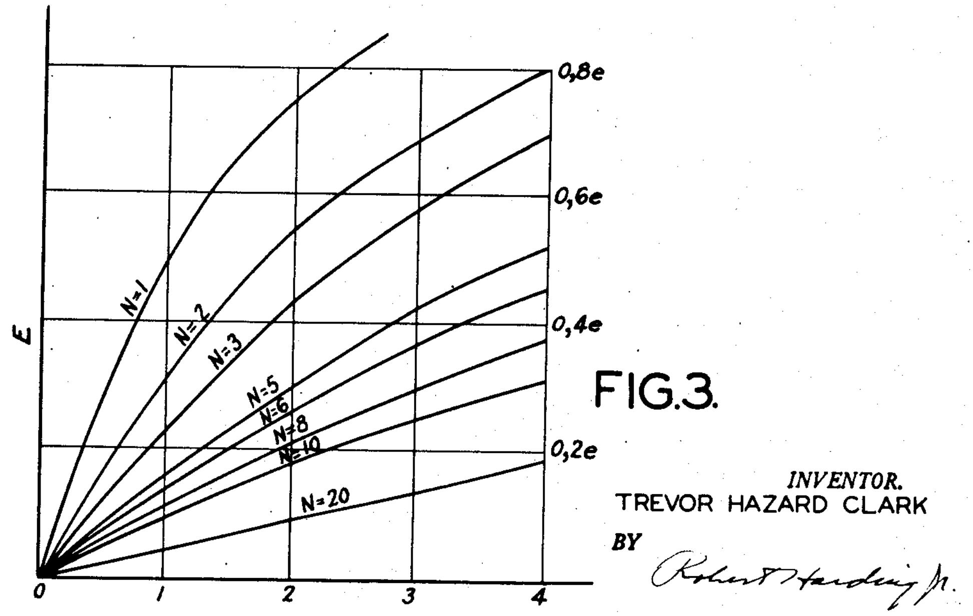

It is possible to obtain useful information from curves such as those of Figs. 3 and 4, as to the effect of the capacitance values of 7 and 13 (or 17 and 20) having different ratios. In Fig. 3 variations of the accumulated potential, E, across condenser 13 are plotted against the number of impulses received for 8 different values of the ratio, N, of the capacitance of condenser 13 to that of condenser 7. The values of potential, E, are also shown expressed as fractions of the potential, *e*, which is the direct potential supplied by battery 8. The respective values of N used in plotting the different curves are indicated on the drawing for the individual plotted curves.

In Fig. 4 different values of the ratio between increments in potential across condenser effected by a first impulse and a fourth impulse are plotted against different values of the ratio, N, of the capacitance of condenser 13 to that of condenser 7. It is seen from this curve that when the ratio N is as large as 7 the first contribution of potential is only 1.5 times as great as the fourth contribution, i. e., increment. However, when N equals 1 (when the 2 condensers are of equal capacity) the first contribution or increment is 7.5 times as great as the fourth.

If the capacity of condenser 7 be great with respect to that of condenser 13 successive contributions of potential to condenser 13 from condenser 7 will be markedly smaller progressively, i. e., the rate of change of potential plotted against the number of impulses received will not be linear. This is clearly shown by the curves of Fig. 3 and is implicit in the curve of Fig. 4.

If the capacity of condenser 7 is too small with respect to that of condenser 13 the potential of battery 8 will have to be very great in order to obtain significant increments of charge for condenser 13 from condenser 7, each time an impulse is received. In the same way when the capacity of condenser 17 is low with respect to that of condenser 20 it becomes necessary for the potential of battery 18 to be very great.

If both of the condensers are selected with very high values of capacitance, the current between them, which has to pass through the armature and front contact of relay 2, may be great enough so that the points will stick. Obviously this must be avoided.

If condenser 13 is of too low a value it will be discharged (or charged) by deflection plates 11. This also is to be avoided and, for the same reason, the value of condenser 20 must be sufficiently large with respect to the capacitors between deflection plates 12.

The use of a system of this kind permits greater dial speed than is possible in systems with all-mechanical metering of the impulses.

It is obvious that electronic switches, according to this invention, may have different numbers of positions than 12. The particular switch shown herein was chosen only by way of example. For a telephone system based on the decimal numerical system a ten position circuit would probably be best.

On the other hand it is obvious that the target area could be conveniently sub-divided to include a great many commutator terminal areas, or if it is desired to base a telecommunication system on a numerical system whose base number is much higher than 10 so as to reduce the number of separate digits dialed. In fact, a single cathode ray switch according to the present invention which has a sufficiently large number of terminals could be employed to count impulses up to a fairly large number and to record the count it makes.

Figure 5:
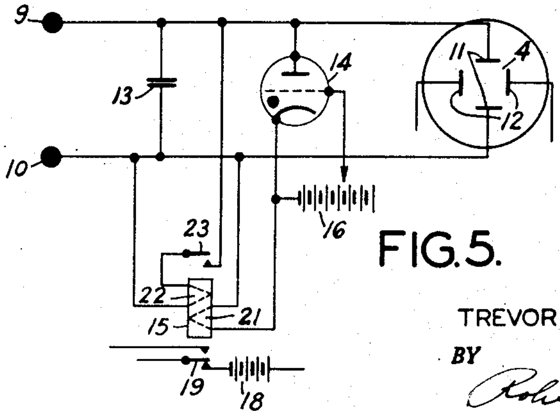
Figs. 5, 6 and 7 show three possible modifications of the circuit of Fig. 1.
Figure 7:
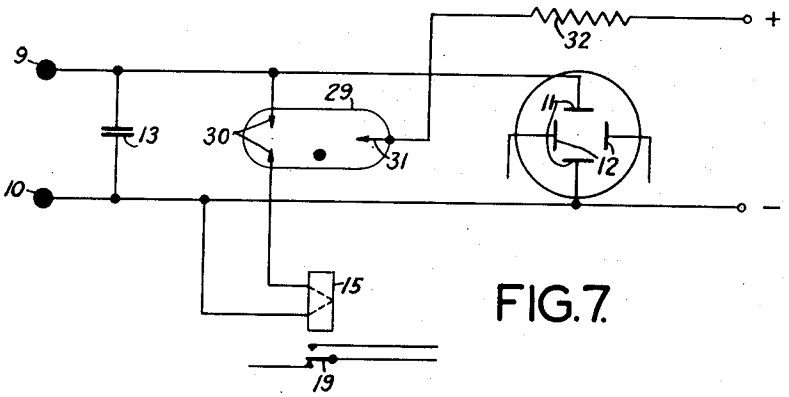
Figure 6:
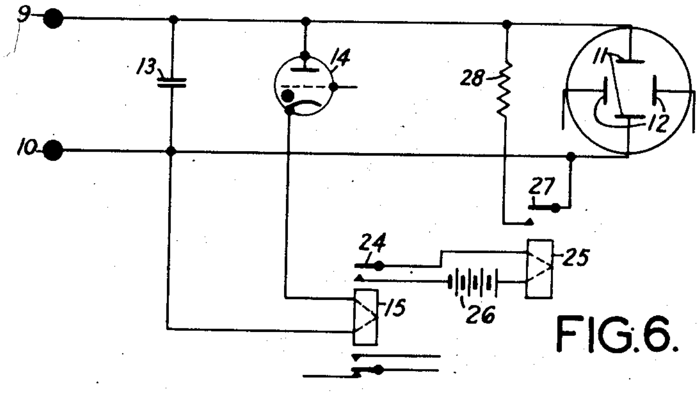

The circuit shown in Fig. 1 is obviously capable of numerous modifications and adapations without departing from the scope of the invention. By way of example, Figs. 5, 6 and 7 show three possible modifications thereof. Figs. 5–7 show principally only the modified portions. It should be understood that any one of these portions can be fitted into Fig. 1 to replace the corresponding portion thereof, which is shown to the right of terminals 9 and 10 in Fig. 1. In these Figs. 5–7 elements which are similar to those of Fig. 1 are given the same reference numerals. The complete operation of the modified systems of Figs. 5–7 will not be described in detail since it is similar to that already explained for Fig. 1. The operation of modified portions will, however, be described.

Referring first of all to Fig. 5, the modification incorporated in this embodiment comprises the provision in coupling relay 15 of an additional winding 22. The first winding, now bearing reference numeral 21 in this figure, is still connected across condenser 13 in series with discharge device 14. The extra winding 22 is connectable across this same condenser by an additional armature 23, of this relay 15, and its cooperating front contact. In this way every time that gas discharge device 14 fires, relay 15 is initially energized through its winding 21 and later, when its armatures have made their front contacts, armature 23 closes the energizing circuit of auxiliary winding 22. This will render the discharge of condenser 13 somewhat more rapid and at the same time will assist relay 15 to actuate its armatures in a very positive manner until condenser 13 is substantially fully discharged. The provision of the winding 22 of relay 15 may not be necessary. Instead, armature 23 and its contact may be adapted to short circuit condenser 13 directly, i. e., without conducting through an additional winding the current which they divert. In such a case this modification would serve only to shorten the condenser-discharge time. In this case it will be necessary to provide, as already explained, a static deflecting potential to hold the beam on a level with the lowest row of positions.

The modified circuit of Fig. 6, in addition to circuit elements of Fig. 1, comprises a second armature 24 for relay 15. This armature makes its front contact when relay 15 is actuated and energizes a second relay 25 via a circuit containing battery 26 for energizing it. This second relay 25 may, of course, have a very fast and positive action. It is provided with an armature 27, which on making its operating contact, connects a low resistance 28 directly across condenser 13. Because of the positive action of relay 25 and the low value of the resistance, condenser 13 will complete its discharge rapidly after the initial actuation of relay 15. It will complete its discharge both through the resistance 28 and the parallel-series circuit of the magnet of relay 15 and discharge device 14. By this arrangement the discharge of condenser 13 cannot be excessively prolonged as it would be for example if the resistance of the magnet of relay 15 were very high. At the same time, however, relay 15 will have ample time to perform its function of impulsing the second control circuit.

In Fig. 7 triode gas discharge device 14 is replaced by a cold cathode tube 29. This tube can either have two electrodes or, as is shown, it may have three. In the latter case the discharge is produced between the electrodes 30. Thereafter a third electrode 31 will maintain ionization of the tube until condenser 13 has been discharged to a desired low residual potential. At 32 is indicated a resistor connected between this third electrode and the positive terminal of a source of direct potential. The negative terminal of the source is connected to another electrode of tube 29, viz., one of the electrodes numbered 30. The value of the potential applied to this electrode and the value of this resistor are selected to insure correct operation of the circuit in the manner indicated. Other modifications and adaptations may also be employed without departing from the scope of the invention.

What is claimed is:

1. Apparatus for receiving a group of impulses and actuating a cathode ray switch in accordance with the number of impulses in the group, comprising a first control circuit including a first stepping condenser for receiving the group of impulses and translating the reception of successive impulses thereof into successive incremental chargings of said first stepping condenser, a cathode ray switch including a target area, electron gun means for projecting a beam of electrons onto the area, first deflection electrodes for deflecting the beam to move its projection on the area in a first direction and second deflection electrodes for deflecting the beam to move its projection on the area in a second direction, means for applying any potential accumulated across the first stepping condenser to the first deflection electrodes to control the amount of the movement of the projection in the first direction in accordance with said number, a second control circuit including a second stepping condenser connected to the first control circuit to respond to selected ones of successive impulses to translate them into successive incremental chargings of said second stepping condenser, means for applying any potential accumulated across the second stepping condenser to the second deflection electrodes to control the amount of the movement of the projection in the second direction in accordance with said number, the directions and amounts of the movements being coordinated so that the projection will be moved to a position on the area corresponding in a predetermined manner to said number.

2. Apparatus as in claim 1 in which the switch includes a plurality of terminal studs each having a predetermined position on the target area which corresponds to a number, the positions being so arranged that when a group of impulses is received said projection will be moved onto the stud whose position corresponds to the same number as the number of impulses in the group.

3. Impulse receiving apparatus for translating the number of impulses in a group of received impulses into a stored representation thereof, comprising a source of impulses, a cathode ray device having a target area, an electron gun for producing a beam of electrons and projecting it on the area, and beam deflecting means, a first control circuit connected to the source and to the beam deflecting means and responsive to a group of impulses received therefrom to deflect the beam in one direction over the area for a predetermined distance in accordance with the number of the impulses in the group, a second control circuit connected to the first control circuit and to the deflecting means and responsive to a certain selected number of impulses in the group to deflect the beam in a second direction over the area for a predetermined distance, the first and second directions being co-ordinate and the first and second control circuits cooperating by their resultant deflections of the beam to move it for successive received impulses in a group thereof to successive predetermined positions on the area, the location of each position proportional to a given number of impulses in a received group.

4. Impulse receiving apparatus as in claim 3 in which each of the selected ones of the impulses is separated from the next selected one by an equal number of impulses.

5. Apparatus for receiving a group of impulses and for producing and storing a representation of the number of impulses in the group comprising an impulse receiving circuit, a cathode ray device having two co-ordinate deflecting circuits, means for translating a predetermined succession of said impulses into a first deflecting voltage, means for applying said first deflecting voltage to one of said deflecting circuits, means included in said first translating means for translating individual impulses within said predetermined succession of impulses into a second deflecting voltage, and means for applying said second deflecting voltage to the other of said deflecting circuits.

6. Apparatus, as defined in claim 5, in which the means for translating a predetermined succession of impulses into the first deflecting voltage comprises a trigger device set to operate at a predetermined voltage, means for applying the second deflecting voltage across said device, whereby said device will trigger when said second deflecting voltage equals said predetermined voltage, and means controlled by the triggering of said device for producing the first deflection voltage.

7. Apparatus, as defined in claim 6, in which each of the translating means comprises a condenser and means for intermittently charging said condenser with predetermined equal charges.

8. Apparatus for receiving impulses, for translating the number of impulses into a representation thereof, and for storing said representation, comprising a source of impulses, a first control circuit comprising an impulse receiving and repeating device connected to said source of impulses, a first storage condenser, a first source of direct potential, the condenser being connected to the source of potential by the repeating device between impulses to be charged from said source, a first stepping condenser which is connected to said storage condenser by said repeating device upon the receipt of an impulse to receive charge therefrom, a cathode ray device including a target area, an electron gun for producing a beam of electrons and projecting it on said area, and beam deflecting means connected to the stepping condenser for deflecting the beam to move its projection successively in a predetermined direction on said area as successive impulses are received and to position it on a subdivision of the area corresponding to the number of received impulses, a relay, a gas discharge device connected across said stepping condenser through said relay, said discharge device being adjusted to ionize so as to discharge said stepping condenser after said stepping condenser has received enough charges for a predetermined potential to be accumulated across its terminals, said relay being momentarily energized by the discharge to repeat predetermined ones of the impulses and to produce for each one thereof a local impulse, a second control circuit comprising said relay, a second source of direct potential, a second storage condenser which is connected to said second source of potential by said relay between local impulses to be charged therefrom, and a second stepping condenser which is connected by said relay each time it repeats an impulse to said second storage condenser to receive charge therefrom, said second stepping condenser being connected to said deflecting means for deflecting said beam to move its projection on said area in a second predetermined direction which is coordinate with said first direction, the resultant deflections cooperating to position said beam projection on a subdivision of said area corresponding to the number of received impulses.

9. Apparatus for receiving impulses, for translating the number of impulses into a representation thereof, and for storing said representation, comprising a source of impulses, a first control circuit comprising an impulse receiving and repeating device connected to said source of impulses, a first storage condenser, a first source of direct potential, said condenser being connected to said source of potential by said repeating device between impulses to be charged from said source, a first stepping condenser which is connected to said storage condenser by said repeating device upon the receipt of an impulse to receive charge therefrom, a cathode ray device including a target area, an electron gun for producing a beam of electrons and projecting it on said area, and beam deflecting means connected to said stepping condenser for deflecting said beam to move its projection successively in a predetermined direction on said area as successive impulses are received and to position said beam on a subdivision of said area corresponding to the number of received impulses, a relay, a gas discharge device connected across said stepping condenser through said relay, said discharge device being adjusted to ionize so as to discharge said stepping condenser after said stepping condenser has received enough charges for a predetermined potential to be accumulated across its terminals, said relay being momentarily energized by the discharge to repeat predetermined ones of the impulses and to produce for each one thereof a local impulse, a second control circuit comprising said relay, a second source of direct potential, a second storage condenser which is connected to said second source of potential by said relay between local impulses to be charged therefrom, a second stepping condenser which is connected by the relay each time it repeats an impulse to said second storage condenser to receive charge therefrom, said second stepping condenser being connected to said deflecting means for deflecting said beam to move its projection on the area in a second predetermined direction which is coordinate with said first direction, the resulting deflections cooperating to position the projection of said beam on a subdivision of the area corresponding to the number of received impulses, and means which are responsive to each energization of said relay to accelerate dischargings of said first stepping condenser.

TREVOR H. CLARK.

References Cited in the file of this patent

UNITED STATES PATENTS

| Number | Name | Date |
|---|---|---|
| 2,122,102 | Lundell | June 28, 1938 |
| 2,132,655 | Smith | Oct. 11, 1938 |
| 2,221,452 | Lewis | Nov. 12, 1940 |
| 2,224,677 | Hanscom | Dec. 10, 1940 |
| 2,267,827 | Hubbard | Dec. 30, 1941 |
| 2,404,106 | Snyder | July 16, 1946 |
| 2,435,840 | Morton | Feb. 10, 1948 |